J. W. GAMBLE.
WATER HEATER.
APPLICATION FILED NOV. 10, 1909.

1,050,209.

Patented Jan. 14, 1913.

2 SHEETS—SHEET 1.

WITNESSES:

INVENTOR:
Joseph W. Gamble
BY
Francis T. Chambers
his ATTORNEY.

UNITED STATES PATENT OFFICE.

JOSEPH W. GAMBLE, OF PHILADELPHIA, PENNSYLVANIA, ASSIGNOR TO JOSEPH S. LOVERING WHARTON, WILLIAM S. HALLOWELL, AND JOHN C. JONES, OF PHILADELPHIA, PENNSYLVANIA, A FIRM.

WATER-HEATER.

1,050,209.   Specification of Letters Patent.   Patented Jan. 14, 1913.

Application filed November 10, 1909. Serial No. 527,205.

*To all whom it may concern:*

Be it known that I, JOSEPH W. GAMBLE, a citizen of the United States of America, residing in the city and county of Philadelphia, in the State of Pennsylvania, have invented a certain new and useful Improvement in Water-Heaters, of which the following is a true and exact description, reference being had to the accompanying drawings, which form a part thereof.

My present invention relates to water heaters and particularly to water heaters of the kind in which water is heated by the direct action of the steam.

The invention is especially adapted for, though not limited in all respects to, use in heating water for steam generating boilers where a portion of the water to be heated is largely free from air or other gas which it is undesirable to admit to the steam generating boilers, while another portion of the water to be heated may contain such air or other gas. For instance, the first portion of water referred to may be water of condensation from condensers having dry air pump connections, and the second portion of water mentioned may come from any suitable source of raw make-up water.

The main object of the invention is the provision of simple and reliable means whereby the water may be effectively heated to the desired temperature and may be effectively freed from air or other gas.

Other objects of the invention are to improve water heaters of the kind specified in various specific respects hereinafter pointed out in detail.

The various features of novelty which characterize my invention are pointed out with particularity in the claims annexed to and forming a part of this specification. For a better understanding of the invention, however, reference may be had to the accompanying drawings in which I have illustrated one of the forms in which the invention may be embodied.

Figure 1:
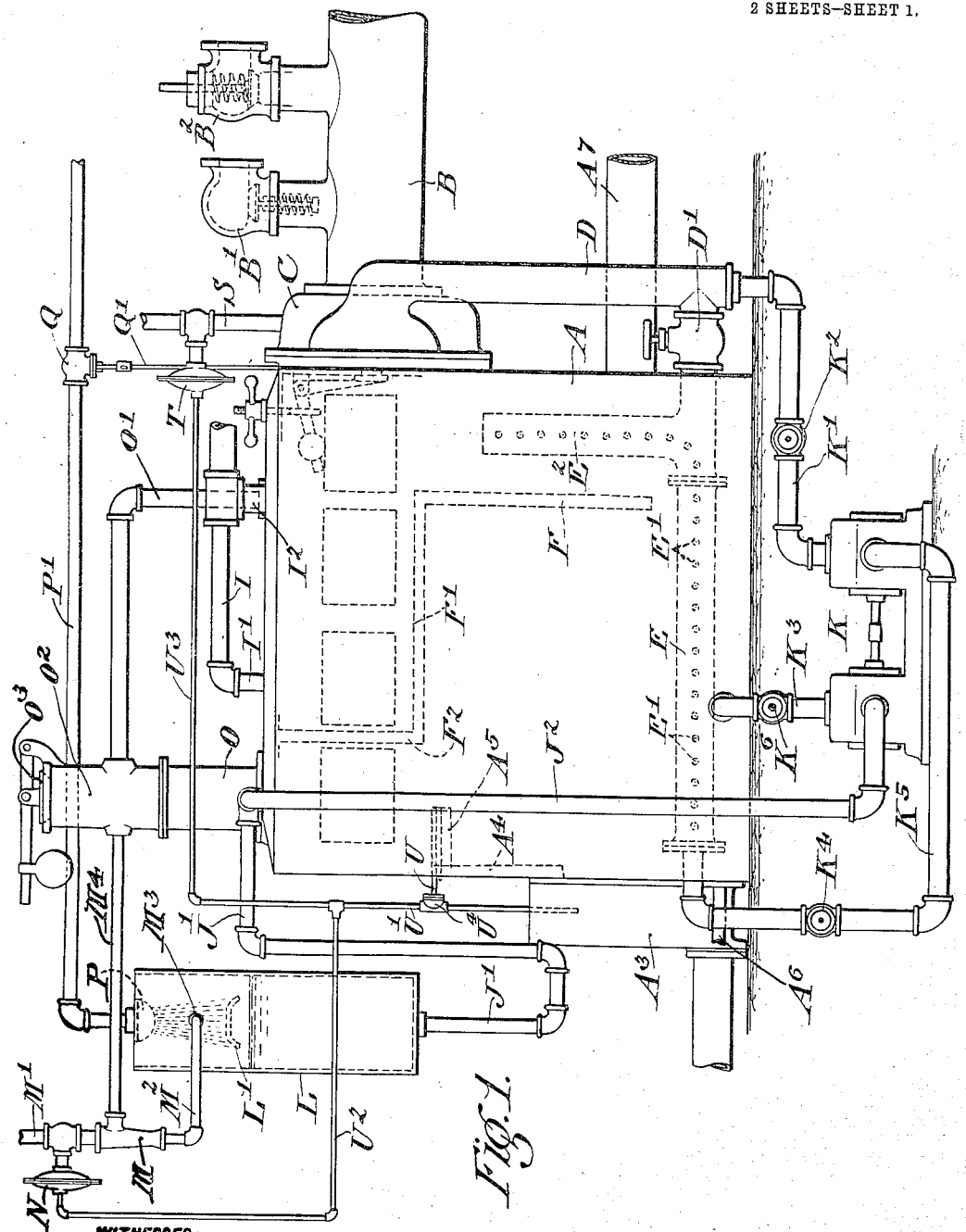
Figure 2:
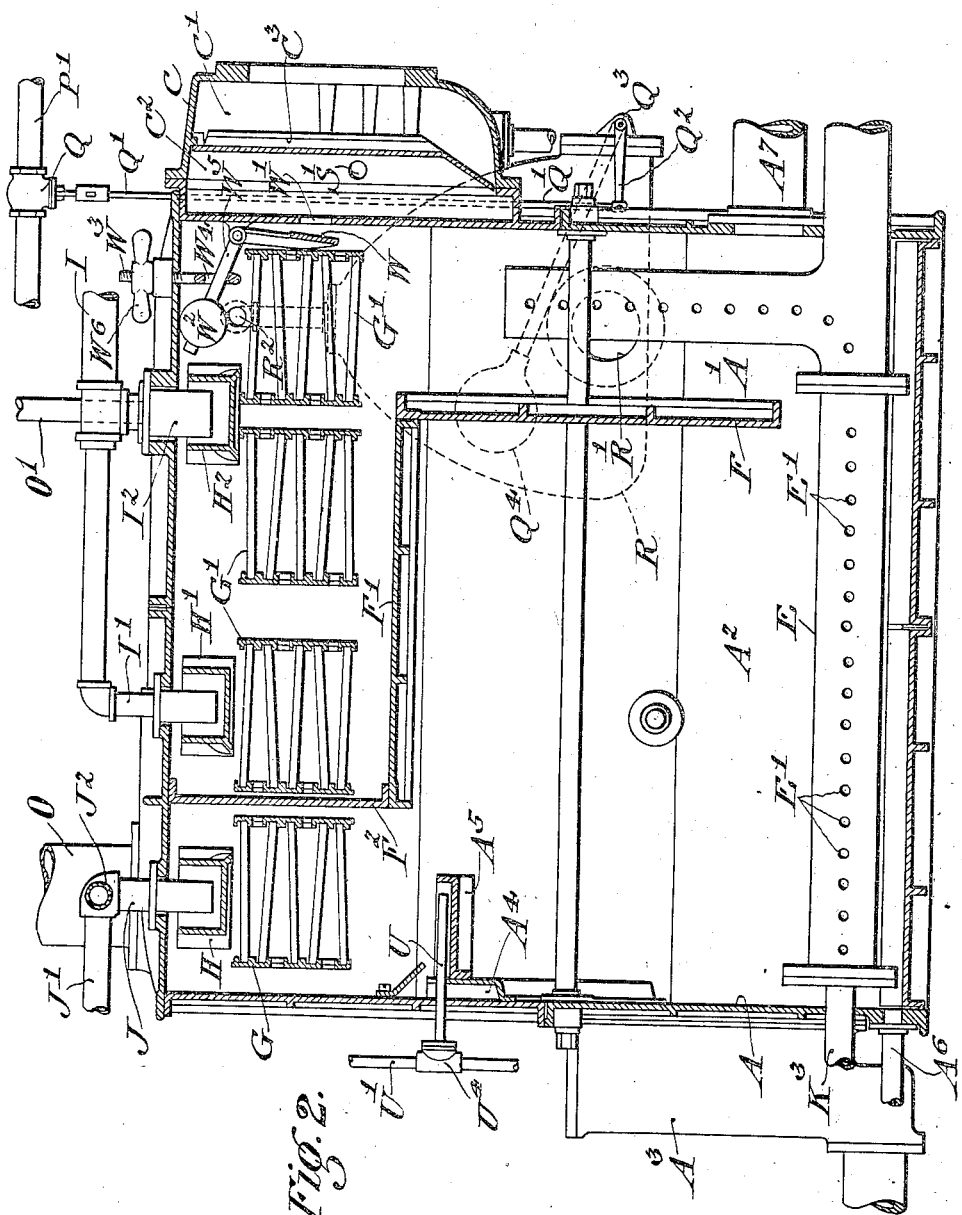

Of the drawings, Figure 1 is a diagrammatic elevation of a feed water heater and connections, and Fig. 2 is a sectional elevation on a larger scale than Fig. 1, showing a portion of the apparatus shown in Fig. 1.

In the drawings, A represents the main closed water heating tank, the upper portion of which is divided into two chambers A' and $A^2$ by partitions F, F', and $F^2$, the lower partition F extending substantially below the normal water line of the tank but not to the bottom of the tank.

B represents an exhaust steam supply pipe as from the auxiliary engines, pumps, etc., of a power plant. The pipe B leads to an oil separator C. Steam may pass into the upper portion of the chamber A' through the port W' controlled by the loaded valve W, and through pipe connection D and stop check valve D' to the branched pipe E, $E^2$, located below the water line in both compartments and formed with perforations E'. From the upper ends of the compartments A' and $A^2$ lead vapor escape pipes O and O' which unite to form the escape pipe $O^2$. The escape pipe $O^2$ is controlled by a loaded valve $O^3$ which opens when the pressure in chambers A' and $A^2$ rises to a predetermined value somewhat above the atmospheric pressure, and closes to prevent the influx of air. The compartment A' is supplied with water relatively free from air or other gas, as from steam condensers with dry air pump connections, or other suitable source of relatively gas free water, by the pipe I and lateral branches I' and $I^2$. The make up water, naturally containing considerable air and in some cases other gas, is supplied to the compartment $A^2$ through the pipes J' and J. $A^7$ represents the service water discharge pipe from the tank A. $A^3$ and $A^4$ represent the overflow connections, and $A^6$ the blow off connection.

K represents a circulating pump which may or may not be employed, as conditions require. The pump K may be of any suitable type. For instance it might be driven by a turbine instead of in manner conventionally illustrated. As shown, the pump K draws water through the pipe $K^3$ from the bottom of the tank A, and discharges into the upper end of the compartment $A^2$ through the pipes $J^2$ and J. Steam for operating the pump K supplied from the pipe D through the pipe K', controlled by the valve $K^2$, and the exhaust of the pump K may be connected by pipe $K^5$, controlled by stop check valve $K^4$, to the pipe E; pipe $K^3$ may be closed by a valve $K^6$.

The make up water flows to the chamber $A^2$ through pipes J' and J from the lower end of an open receptacle L. The raw water supply pipe P' discharges into receptacle L, and is controlled through suitable connections by a float Q⁴ responsive to the variations in the water level in the tank A. Air and other gas may be drawn through the pipe M⁴ by a steam ejector M supplied with live steam from the pipe M' and discharging into the receptacle L wherein the steam passing through the ejector is condensed by the raw water admitted to the receptacle L through the pipe P'.

S represents a live steam supply pipe connected to the separator C controlled by a valve T. The valve T and the valve N, controlling the supply of live steam to the ejector M, are controlled thermostatically—in the form shown—by a single thermostat U located in the compartment A² above the water level therein and in the path through which the water admitted to compartment A² passes into the main body of water in the compartment.

The steam supply pipe B preferably has connected to it a vacuum breaking valve B'. The valve B' also serves to prevent any back flow siphon action through the pipe D and valve D' should the latter fail to prevent such action. The pipe B is preferably provided also with a pop-off or safety valve B², limiting the pressure of the steam in the pipe B. The oil separator C may be of any suitable form, and as shown in the drawings comprises chambers C' and C² partially separated by a corrugated baffle C³, as in a type of oil separators in common use. The live steam supply pipe S is connected to a port S' opening into the chamber C² of the oil separator.

The pipe D leads from the chamber C² of the oil separator C, and the port W', controlled by the valve W, also leads from the chamber C².

The valve W is shown as a weighted valve which may be adjusted by adjusting the weight W² on the arm of the valve carrying it so that the valve will open and admit steam from the chamber C² directly into the upper end of the compartment A' on any desired excess of the pressure in chamber C² above the pressure in compartment A'. The threaded spindle W³, having a yoke or eye W⁴ at its lower end through which the arm W⁵ passes, and a threaded hand wheel W⁶, form a means whereby the valve W may be held open when desired regardless of the pressure conditions in chamber C² and compartment A'.

In the form shown it will be observed that the partitions F, F' and F² are so arranged that the compartment A' is substantially wider at its upper end and substantially narrower at its lower end than the compartment A². As shown, the spray pipe E is horizontal and extends along the bottom of both compartments, while the spray pipe E² is a vertical lateral branch of the spray pipe E and is located in, and extends upward in the compartment A' nearly to the normal water line therein. Of course it will be understood that any suitable arrangement of spraying pipes may be employed.

The valve connections for controlling the valve Q may be of any usual and suitable type. In the form illustrated in Fig. 2, the spindle of the valve Q is connected by a rod Q' to the arm Q² of a rock shaft Q³. An arm of the rock shaft Q³ carries the float Q⁴ which is located in the tank R connected to the tank A below the water line by a port R', and above the water line by a similar equilizing port R². The purpose of the separate tank R is to make the float less quickly responsive to temporary and minor variations in the level of the water in the compartment A².

The pipes J, I' and I² discharge within the tank A into trough like receptacles H, H' and H², respectively, which discharge by overflow onto suitable trays or baffles G and G' which may be of ordinary construction. The receptacle H and tray or baffle G are located in the compartment or chamber A² and receptacles H' and H² and trays or baffles G' in the chamber A'. The tray G is arranged to discharge in large measure or entirely upon the trough or ledge A⁵ arranged in the compartment A² above the water level. In consequence of this arrangement, the water falling from the baffle G does not pass at once below the surface of the body of water in the compartment A², but is arrested in its downward movements by the trough A⁵, thus giving the air entrained a chance to separate from the water before the latter passes off into the main body or pool.

The thermostat U, by which the valves T and N are controlled is located in the trough A⁵ and is thus subjected directly to the thermal action of the make-up water supplied to the compartment A² just before this water passes into the body of water in the compartment. The thermostat is more or less effectually shielded by the manner in which it is arranged, from the direct action of the steam rising from the body of water in A², but of course is indirectly responsive thereto because this heats the water passing over the trays G and this water acts directly on the thermostat as before stated. In the form shown, the thermostat U directly controls a valve U⁴ in the pipe U' connected to any suitable source (not shown) of fluid under pressure as steam or compressed air. Pipe U' has branches U² and U³ running to the valves N and T, which may be of any usual type of fluid pressure motor valves.

The ejector M may be of any suitable form, of which many are well known, and does not therefore require any detailed illustration or description. The discharge pipe M², by which the steam and air and gases drawn from the main tank A through the pipe M⁴ by the ejector opens into the receptacle L. The latter is open at its upper end to permit the ready escape of air or other gas, the discharge from the pipe M² taking place below the spray head P connected to the discharge end of the raw water supply pipe P' and above the baffle L' which is arranged in the receptacle L above the water line therein and serves to arrest the flow of the water and thereby diminish the amount of air and gases carried into the pool or main body of water in the receptacle L by entrainment with the water discharged from the head P and formed by the condensation of steam admitted through the pipe M². The water admitted to receptacle L through spray head P absorbs all or a large portion of the heat of the steam passing into the receptacle from the ejector M.

In starting the apparatus into operation I usually prefer to heat the water in the tank A until it begins to boil before admitting water through the pipes P' or I, or before withdrawing water from the tank through the pipe A⁷. This can be accomplished by the admission of live steam through pipe S when sufficient exhaust steam is not available. It will of course be understood that the pipes I, S, M' and P' may be, and usually are, controlled by suitable hand valves not shown. After the water in the tank A is heated to the boiling point the apparatus is in condition for regular operation. The comparatively gas free water will then be admitted to the upper end of the compartment A' through the pipes I, I' and I² in accordance with the conditions of operation of the condensers or like devices supplying this water. When the water thus supplied is less than the amount of water being drawn from the tank through the pipe A⁷, the float Q⁴ falls and opens the valve Q thus permitting water to flow through the pipe P' and spray head P into the open receptacle L. From the receptacle L, the water passes by gravity through the pipes J' and J to the receptacle H in the compartment A². If the exhaust steam being supplied to the tank A through the pipe B, separator C, pipe D, and branch pipe E, E², is somewhat more than sufficient to heat the water in the tank to the boiling point, the steam escaping from the surface of the main body of water in compartment A² will be sufficient to keep the thermostat U at the temperature at which the valves controlled by it are closed, and will be sufficient in amount to sweep out with it all air carried into the compartment A² by the water, if any, passing through the pipe J and also the air liberated from the main body of water in the compartment A² by the boiling to which it is subjected therein. This air or vapor escapes with the excess steam through the port controlled by the valve O³. Should, however, the steam admitted to the tank A by the pipe B be insufficient to maintain the desired temperature in the compartment A², the thermostat U will operate to cause the valves T and N to be opened. The opening of the valve T admits live steam to the compartment C², and the opening of the valve N admits live steam to the steam ejector M. The opening of the valve T thus insures the admission of steam to properly heat up the water in the tank A, and the admission of steam to the ejector M insures the proper withdrawal of air and gases from the compartment A' without the loss incident to sweeping of air or other vapors out of the tank through the port controlled by the valve O³.

The circulating pump K, which may or may not be used, when in operation, serves to effect a circulation of water in the tank which facilitates its proper heating and effectual liberation of all air or other gas mixed with it. As the work to be performed by the pump K is relatively small, the steam for operating it may be drawn from the separator C since only a few pounds of steam pressure are necessary. It will be understood that the valve D' may be closed either wholly or partially when the pump K is in operation to insure a steam supply to the pump of sufficient volume and pressure. The exhaust steam from the pump K may pass, as shown, directly into the pipe E. When it is not desired to operate the pump K it may be effectually cut out by closing the valves K² and K⁴.

In the normal operation of the apparatus in a plant of the type for which the apparatus is particularly designed, a large proportion of the water heated in the tank comes from the condensers and is well above the temperature of ordinary make up water and contains little air or other gas. Because of the much greater excess of water from the condensers over the make-up water in ordinary conditions, it is necessary or at least desirable, to provide a much larger space in the upper end of the compartment A' than in the upper end of the compartment A² to facilitate the desired heating of the water admitted to the tank in a rapid manner. In the case of the make up water supplied to the chamber A², however, it is not only desirable to heat the water, but to subject it to a more or less prolonged and vigorous boiling in order to free it from air or other gas. The water supplied to compartment A² is also heated in such an extent and under such conditions as to liberate the air or other gas which it may contain, but usually the main object of injecting steam into the water from the condensers is merely to heat it.

In consequence, the capacity of the compartment $A^2$ below the water level, and the steam and air liberating surface of the body of water in the compartment $A^2$ should usually be made, as shown, greater than the corresponding capacity and surface for chamber $A'$. By separating the compartments as shown, the air or other gas freed from the water admitted to compartment $A^2$ is practically prevented from passing into the purer water in the compartment $A'$. Of course, as shown, the compartments $A'$ and $A^2$ are connected above the water level through the vapor outlet pipes O and O', but under ordinary conditions there will be no flow from either outlet pipe into the other.

While the invention is primarily designed for operation with water supplied from two sources, only one of which furnishes water containing much air or other gas, it will be obvious that some features of the invention may be used with advantage where all the water passing through the heater comes from one source and contains much air or other gas which needs to be removed. For instance, the particular apparatus disclosed may obviously be employed for this purpose by causing all of the water passing through the tank to enter the tank through the inlet pipe J. Of course, where the apparatus is intended for use solely under such conditions that all of the water passing through the tank is admitted through the pipe J, the parts of the apparatus shown but not used under such conditions, would ordinarily be omitted.

While, in accordance with the provisions of the statutes, I have herein described and illustrated in detail the best form of my invention now known to me, it will be obvious to those skilled in the art that changes may be made in the form of the apparatus disclosed without departing from the spirit of my invention, and it will also be readily apparent to those skilled in the art that certain features of the invention described and illustrated herein may be employed with advantage in certain cases without a corresponding use of other features of the invention.

Having now described my invention, what I claim as new, and desire to secure by Letters Patent, is:

1. A device for heating, and freeing from air or other gas, water from two sources, the water from one of which normally contains more air or gas than the water from the other source, comprising in combination a heating tank having a partition extending from the upper side of the tank to a level below the water line therein, and dividing the upper portion of said tank into two chambers, means for introducing the water from one of said sources into one of said chambers, means for introducing water from the other of said sources into the other of said chambers, and means for heating the water admitted to the tank, said tank having a gas outlet leading from the upper end of the chamber into which the water containing the greater amount of air or other gas is admitted.

2. A device for heating, and freeing from air or other gas, water from two sources, the water from one of which normally contains more air or gas than the water from the other source, comprising in combination, a heating tank having a partition dividing the upper portion of said tank into two chambers connected below the partition, means for maintaining the water level in said tank above the bottom of said partition, means for introducing water from one of said sources into one of said chambers and from the other source into the other of said chambers, and means for injecting steam into said tank below the water level, said tank having a vapor outlet leading from the upper end of the chamber into which the water containing the greater amount of air or gas is admitted.

3. A device for heating and freeing from air or other gas, water from two sources, the water from one of which sources normally contains more air or gas than the water from the other source, comprising in combination, a heating tank having a partition dividing the upper portion of said tank into two chambers connected below the partition, means for maintaining the water level in said tank above the bottom of said partition and below the upper end of the tank, means for introducing the water from one of said sources into one of said chambers and from the other source into the other of said chambers, and means for injecting steam into said tank below the water level, said tank having vapor outlets leading from the upper ends of both of said chambers.

4. In combination, a heating tank having a partition dividing the upper portion of said tank into two chambers connected below the partition, a supply connection to the upper end of one of said chambers for water from condensers, a make-up water supply connection to the upper end of the other of said chambers, means responsive to the water level in said tank for controlling the admission of make up water arranged to maintain the water level in the tank above the bottom of said partition, said tank having a vapor outlet from the upper end of each of said chambers, a steam ejector for drawing air or gas from the tank through said vapor outlets, and means for utilizing the heat of the steam passing through the ejector in warming the make up water.

5. Water heating apparatus, comprising in combination, a heating tank having a steam inlet leading into the lower portion of said tank and a water inlet leading into the upper end of said tank, provisions for regulating the water level in said tank at a definite distance below the upper end of the tank, a shallow trough-like shelf arranged in the tank slightly above the water level and in the path of the water passing into the tank through the water inlet, and controlling mechanism for the apparatus, including a thermostat arranged on said shelf.

6. A device for heating water and removing air or other gas therefrom, comprising in combination, a closed main heating tank having water and steam inlets and separate vapor and water outlets, a receptacle from which air and gas may readily escape, a water supply conduit leading from said receptacle to the water inlet of said main heating tank, a steam ejector discharging into said receptacle, a connection between said ejector and said vapor outlet whereby air or gas is drawn from said vapor outlet by the ejector and discharged into said receptacle, and means for supplying water to said receptacle, whereby the water so supplied is heated and conveyed to the main tank.

7. A device for heating water and removing air or other gas therefrom, comprising in combination a closed main heating tank having water and steam inlets and separate vapor and water outlets, a receptacle from which air and gas may readily escape, a water supply conduit leading from said receptacle to the water inlet of said main heating tank, a steam ejector discharging into said receptacle, a connection between said ejector and said vapor outlet whereby air or gas is drawn from said vapor outlet by the ejector and discharged into said receptacle, means for supplying water to said receptacle, whereby the water so supplied is heated and conveyed to the main tank, a thermostat located within said main tank, and connections whereby the supply of steam to the ejector is controlled by said thermostat.

8. A device for heating water and removing air or other gas therefrom, comprising in combination, a closed main heating tank having water and steam inlets, a water outlet, and a vapor escape conduit, a loaded outlet valve controlling said conduit, a receptacle from which air or other gas may readily escape, a water supply conduit leading from said receptacle to the water inlet of said main tank, a steam ejector discharging into said receptacle, a connection between said ejector and said vapor outlet conduit whereby air or gas is drawn from said vapor outlet by the ejector when in operation, and is discharged into said receptacle, means responsive to the conditions in said main heating tank for bringing the ejector into operation except when the pressure in the main heating tank is sufficient to open said loaded valve, and means for supplying water to said receptacle whereby the water is heated by steam from said ejector and is conveyed to the main tank.

9. A device for heating water and removing air or other gas therefrom, comprising in combination, a heating tank, a water inlet leading into the upper end of said tank, a vapor outlet leading from the upper end of said tank, means for discharging steam into the lower portion of said tank, including pipes running to a main steam supply and to an auxiliary steam supply, a thermostat in proximity to said water inlet and in the path of the water admitted thereby, and connections whereby said thermostat controls the auxiliary steam supply pipe.

10. A device for heating water and removing air or other gas therefrom, comprising in combination, a closed main heating tank, means for introducing water to be heated to the upper portion of said tank, a vapor escape pipe leading from the upper end of said tank, means for introducing steam into the lower portion of the tank, a gas exhausting mechanism connected to the upper portion of the tank, and a thermostat arranged in the upper portion of the tank, and connections whereby it controls the operation of the air exhausting apparatus.

11. A device for heating water and removing air or other gas contained therein, comprising in combination a closed heating tank, means for maintaining the water at a predetermined level therein, said means including an inlet leading into the tank above the water level and a supply pipe through which water flows to said inlet, and means responsive to the rise and fall of the water level in said tank for controlling the flow of water through said pipe, a baffle in said tank located above the water level over which the water admitted to the tank through said inlet flows, a thermostat located in the tank above the water level and below the baffle and in the path of the water flowing off the baffle, means for discharging steam into the tank below the water level, said means including a main low pressure steam supply pipe and an auxiliary high pressure steam supply pipe and a valve in the last mentioned pipe controlled by said thermostat.

12. In a system for heating water with exhaust steam, a steam tank, water supply and discharge connections thereto, a steam circulating pump for drawing water from the bottom of said tank and discharging it into the upper end of said tank, connections whereby the exhaust steam from said pump is discharged into said tank and exhaust steam supply connections to said tank and to said pump whereby the exhaust steam may be passed directly into said tank to heat the water therein and may be passed into said tank through said pump after operating the latter.

13. In a hot water heating system, a closed tank, a perforated steam discharge pipe located in the lower portion of said tank, a steam supply pipe, a steam circulating pump drawing water from the bottom of said tank and discharging into the upper end of said tank, connections whereby steam may be passed directly from said supply pipe to said discharge pipe or to the steam cylinder of said pump, and connections whereby the exhaust steam from said pump is discharged into said discharge pipe.

14. In a system for heating, and freeing from air or other gas, water from two sources, the water from one of which sources contains substantially more air or gas than the water from the other source, the combination of a main heating tank, a partition extending from the upper side of the tank to a point below the water line therein, and dividing the upper portion of the tank into two compartments connected below the water line, means for introducing water from one of said sources into the upper end of one compartment and water from the other of said sources into the upper end of the other compartment, a spray pipe located in the tank below the water line, a steam supply chamber having a connection to the spray pipe, and a second connection to the upper end of the compartment into which the water containing the less amount of air or gas is admitted, and a loaded valve which opens on a predetermined excess of pressure in the chamber over that in the tank.

15. In a system for heating, and freeing from air or other gas, water from two sources, the water from one of which sources contains substantially more air or gas than the water from the other source, the combination of a main heating tank, a partition extending from the upper side of the tank to a point below the water line therein, and dividing the upper portion of the tank into two compartments connected below the water line, means for introducing water from one of said sources into the upper end of one compartment and water from the other of said sources into the upper end of the other compartment, a spray pipe located in the tank below the water line, a steam supply chamber having a connection to the spray pipe, and a second connection to the upper end of the compartment into which the water containing the less amount of air or gas is admitted, a loaded valve which opens on a predetermined excess of pressure in the chamber over that in the tank, and means for holding said valve open regardless of the relative pressure conditions in the chamber and tank.

16. In a system adapted to heat and free from air or other gases, water from two sources where the bulk of the water comes from one of said sources and is relatively free from air or gas, while the remainder of the water coming from the other source contains relatively large amounts of air or other gases, the combination of a main heating tank, a partition extending from the upper side of the tank to a point below the water line therein and dividing the upper portion of the tank into two compartments connected below the water line, said partition being so disposed that the upper surface of the water in said compartments is substantially smaller than the corresponding water surface in the other compartment, means for introducing the water from said one source into the upper end of said one compartment, means for introducing water from said other source into the upper end of the said other compartment and means for injecting steam into the lower end of the tank at each side of the lower end of said partition.

17. In a system adapted to heat and free from air or other gases water from two sources where the bulk of the water comes from one of said sources and is relatively free from air or gas, while the remainder of the water coming from the other source contains relatively large amounts of air or other gases, the combination of a main heating tank, a partition extending from the upper side of the tank to a point below the water line therein and dividing the upper portion of the tank into two compartments connected below the water line, said partition being so disposed that the upper surface of the water in said compartments is substantially smaller than the corresponding water surface in the other compartment, while the volume of the steam space in said one compartment is substantially greater than the corresponding volume in said other compartment; means for introducing the water from said one source into the upper end of the said one compartment, means for introducing water from said other source into the upper end of the said other compartment and means for injecting steam into the lower end of the tank at each side of the lower end of said partition.

18. In a system adapted to heat and free from air or other gases, water from two sources where the percentage of air or other gases in the water from one source is greater than the percentage of air or other gases in the water from the other source, the combination of a main heating tank, a partition extending from the upper side of the tank to a point below the water line therein dividing the upper portion of the tank into two compartments connected below the water line, means for introducing water from said one source into the upper end of one of said compartments and means for introducing water from said other source into the upper end of the other compartment and means for injecting steam into the lower end of the tank at each side of the lower end of said partition, said partition being so disposed that the ratio of the area of the upper surface of the water to the volume of the steam space above the water is smaller in the case of said one compartment than in the case of said other compartment.

JOSEPH W. GAMBLE.

Witnesses:
ROBERT G. CLIFTON,
W. ATWOOD MEHARG.